United States Patent
George et al.

(10) Patent No.: US 10,674,654 B2
(45) Date of Patent: Jun. 9, 2020

(54) REMOTE SENSING MULTIVARIATE CROPLAND MANAGEMENT APPARATUS AND METHOD OF USE THEREOF COMPRISING CROP HEALTH DATA SET AND CROP MANAGEMENT RECOMMENDATIONS

(71) Applicants: Thomas George, Los Angeles, CA (US); Chacko Jacob, Eau Claire, WI (US)

(72) Inventors: Thomas George, Los Angeles, CA (US); Chacko Jacob, Eau Claire, WI (US)

( * ) Notice: Subject to any disclaimer, the term of this patent is extended or adjusted under 35 U.S.C. 154(b) by 298 days.

(21) Appl. No.: 15/693,358

(22) Filed: Aug. 31, 2017

(65) Prior Publication Data

US 2018/0077852 A1   Mar. 22, 2018

Related U.S. Application Data

(60) Provisional application No. 62/495,712, filed on Sep. 22, 2016.

(51) Int. Cl.
| | |
|---|---|
| *A01C 21/00* | (2006.01) |
| *A01B 79/00* | (2006.01) |
| *A01G 25/16* | (2006.01) |
| *G06Q 50/02* | (2012.01) |
| *G06Q 10/06* | (2012.01) |
| *A01G 22/00* | (2018.01) |
| *A01C 23/04* | (2006.01) |

(52) U.S. Cl.
CPC .......... *A01B 79/005* (2013.01); *A01C 21/005* (2013.01); *A01C 21/007* (2013.01); *A01G 22/00* (2018.02); *A01G 25/16* (2013.01); *G06Q 10/0637* (2013.01); *G06Q 50/02* (2013.01); *A01C 23/042* (2013.01)

(58) Field of Classification Search
CPC ... A01B 79/005; A01C 21/007; A01C 23/042; A01G 22/00; A01G 25/16; G06Q 10/0637; G06Q 50/02; Y04S 10/54
USPC .............................................. 250/208.1, 221
See application file for complete search history.

(56) References Cited

U.S. PATENT DOCUMENTS 4,755,942 A * 7/1988 Gardner ................. A01G 25/16
                                                                  47/1.01 R

* cited by examiner

*Primary Examiner* — Que Tan Le
(74) *Attorney, Agent, or Firm* — Kevin Hazen

(57) ABSTRACT

The invention comprises a method and apparatus for managing cropland comprising the steps of: (1) wirelessly linking a remote sensing platform to a ground based communication system; (2) spatially resolving into a set of locations a ground matrix area using optics of the remote sensing platform; (3) optically measuring for each member of the set of locations: first reflected cropland radiation in a visible range using the remote sensing platform, second reflected cropland radiation in a near-infrared range, and emitted radiation in an infrared range of 2500 to 12,000 nm; (4) generating a crop health data set for each set of locations using the combined remote sensing data; (5) repeating the steps of spatially resolving and optically measuring to periodically update the crop health data set; and (6) communicating the specific crop management recommendations to a farm treatment system.

19 Claims, 5 Drawing Sheets

REMOTE SENSING MULTIVARIATE CROPLAND MANAGEMENT APPARATUS AND METHOD OF USE THEREOF COMPRISING CROP HEALTH DATA SET AND CROP MANAGEMENT RECOMMENDATIONS

CROSS-REFERENCES TO RELATED APPLICATIONS

This application claims benefit of U.S. provisional patent application No. 62/495,712 filed Oct. 13, 2016.

BACKGROUND OF THE INVENTION

Field of the Invention

The invention relates generally to agriculture.

Discussion of the Prior Art

Patents related to the current invention are summarized here.

R. Lindores, et. al., "Wide-Area Agricultural Monitoring and Predicting", U.S. Pat. No. 8,731,836 (May 20, 2014) describe a ground based normalized difference vegetative index used to calibrate an aerial agricultural measurement.

Problem

There exists in the art of agriculture a need for accurate, precise, and timely intervention to alter crop growing conditions.

SUMMARY OF THE INVENTION

The invention comprises an iteratively updated, multivariate/multi-dimensional, and spatially resolved agriculture aid apparatus and method of use thereof.

DESCRIPTION OF THE FIGURES

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises a method and apparatus for managing cropland comprising the steps of: (1) digitally and wirelessly linking a remote sensing platform to a ground based communication system; (2) spatially resolving into a set of locations an m×n ground matrix using both optics and detectors of the remote sensing platform, where m and n comprise positive integers of at least one hundred; (3) using the remote sensing platform, optically measuring for each member of the set of locations: first reflected cropland radiation in a first visible range using the remote sensing platform, second reflected cropland radiation in a second near-infrared range, and emitted radiation in a third infrared range of 2500 to 12,000 nm; (4) generating a crop health data set of the set of locations and the associated first reflected cropland radiation, the second cropland radiation, and the emitted radiation; (5) repeating the steps of spatially resolving and optically measuring to update the crop health data set at least daily during a period of at least one month; (6) analyzing the crop health data set to yield a crop health analysis comprising specific crop management recommendations for each element of the spatially resolved set of locations; and (7) communicating the specific crop management recommendations to a farm treatment system.

Herein, a z-axis is aligned with gravity and an x/y-plane represents cropland. As cropland is often not level, the cropland is optionally represented as a projection of the cropland along the z-axis onto the x/y-plane.

Herein, near infrared light (NIR) light comprises light from 700 to 2500 nm and short wave near infrared light comprises light from 700 to 1100 nm. Infrared light comprises: (1) short wave infrared light (SWIR) light from 1000 to 3000 nm or non-NIR SWIR light from 1100 to 3000 nm; (2) mid-wave infrared (MIR or MWIR) from 3000 to 5000 nm (2000-3333 $cm^{-1}$ or wave numbers); and (3) long wave infrared, also referred to as thermal infrared (TIR) from 8,000 to 12,000 nm (833-1250 $cm^{-1}$), which is the fingerprint region to chemists.

As further described, infra, a remote agriculture monitoring system yields simultaneous information on the state of growth, state of health, and/or future needs of spatially resolved sections of an agricultural area through use of remote spectroscopy, history, topology, and/or weather forecasts.

Figure 1:
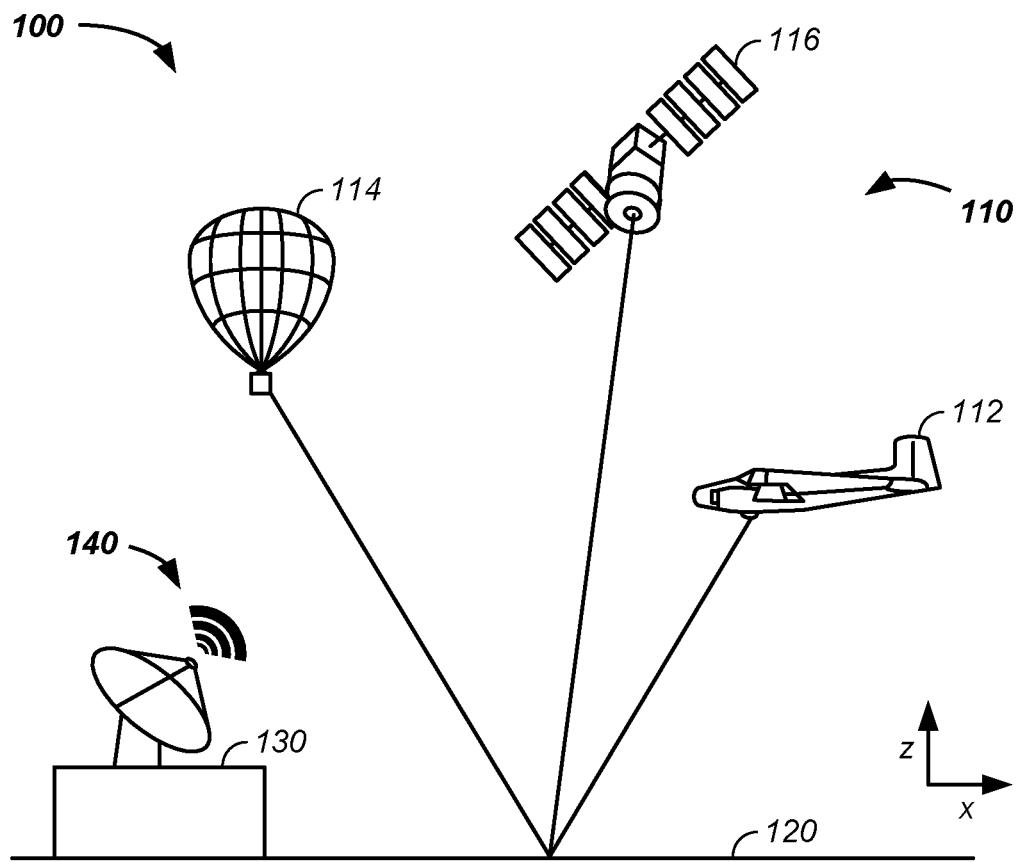
FIG. 1 illustrates remote monitoring of agricultural land.

Referring now to FIG. 1, a remote agriculture monitoring system 100 is described. As illustrated, one or more remote sensing platforms 110 are used to monitoring agricultural land 120, where at least a subset of gathered data is relayed to a base system 130, such as through wireless communication 140. As illustrated, the remote sensing platforms comprise one or more of: an airplane 112, a balloon 114, and a satellite 116. However, any aerial and/or remote sensing platform is optionally used, such as a drone. Herein, for clarity of presentation and without loss of generality the satellite 116 is used to refer to the remote sensing platform 110. Any of the remote sensing platforms 110 carry one or more instruments for monitoring elevation, temperature, humidity, soil type, and/or spatially, temporally, and wavelength resolved light in the electromagnetic spectrum, such as in the visible, near-infrared, and infrared wavelength regions as further described infra. The remote sensing platform 110 optionally delivers the subset of the gathered data to a farmer and/or end user directly and/or indirectly such as via cell-phone, computer, and/or personal data assistant.

Spatial Resolution

In this section, spatial resolution is addressed. However, the spatial resolution aspects described herein function in conjunction with wavelength resolution and temporal analysis, each further described infra.

Figure 2:
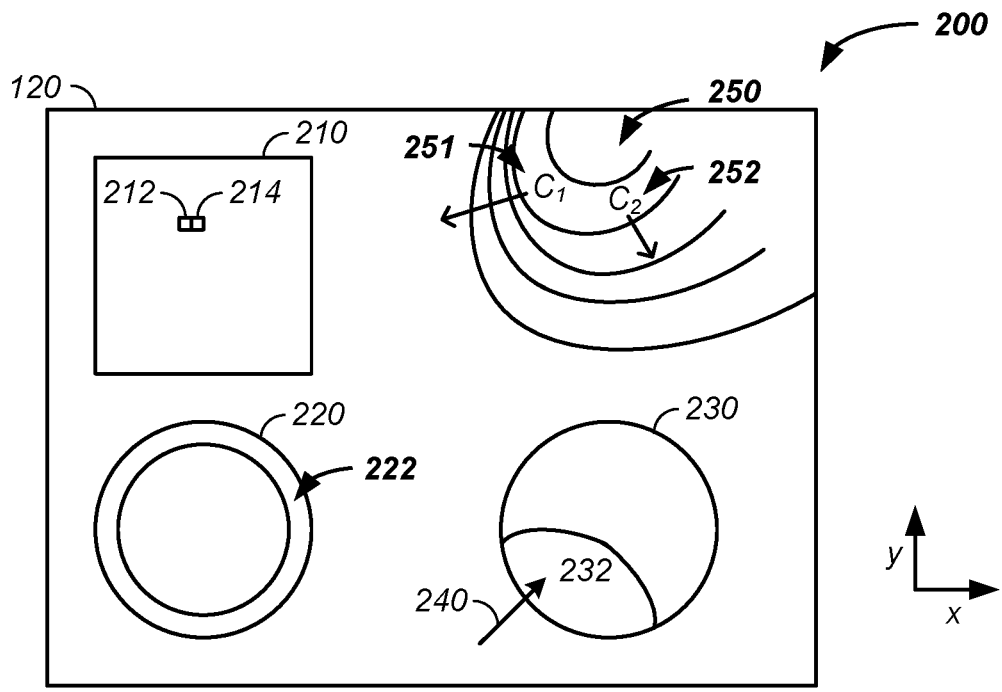
FIG. 2 illustrates spatially resolved monitoring of agricultural land.

Referring now to FIG. 2, a spatially resolved monitoring system 200 is described for monitoring the agricultural land 120. For clarity of presentation and without loss of generality, several spatial monitoring examples are provided.

Example I

Still referring to FIG. 2, a first example of use of the spatially resolved monitoring system 200 is described. In this example, an agricultural field 210 is monitored. As illustrated, the agricultural field is made up of an array of spatial sub-elements. Here, a first spatial sub-element 212 and a second spatial sub-element 214 of the field are monitored. Optionally and preferably, spatial resolution of the remote agricultural monitoring system is less than 1, 5, 10, 20, 25, or 50 meters. Typically, a 10 meter spatial sub-element is sufficient to make enhanced agricultural decisions. Detector element sizes and coupling optics on the one or more detector arrays on the satellite 116 are optionally and preferably configured to match the desired ground spatial resolution in each wavelength range used.

Example II

Still referring to FIG. 2, a first central pivot crop circle 220 is illustrated. Here, the remote agricultural monitoring system 100 combined reflected light intensities as a function of wavelength, as further described infra, with a fertilizer application history and/or a crop protection history to remotely yield actionable information of the entire area of the first central pivot crop circle 220 requiring a fertilizer and an outer perimeter area 222 requiring extra watering. Key here is that the spatial resolution, described in the previous example, is combined with remote spectroscopy and optionally with historical information to yield actionable information on fertilizing and watering particular areas of the crop in the first pivot crop circle. Particularly, a fertilizer can be added to the watering system for a first watering period and the pivoting irrigation system should be configured with extra pressure in the outer perimeter area 222 and/or less pressure toward a central point of the first central pivot crop circle in a second watering period. While the farmer may guess that the crops in general need fertilizer through experience and/or may guess that the outer perimeter area 222 needs more water by visual inspection, the remote spectroscopy remotely generates a quantitative metric of how much additional fertilizer and water is necessary or optimal for individual spatially resolved areas of each crop area and does so without a required visual inspection by the farmer.

Example III

Still referring to FIG. 2, a second central pivot crop circle 230 is illustrated. In the second pivot crop circle 230 a treatment area 232 is identified, such as the southwest region of the second pivot crop area. Here, the remote agricultural monitoring system 100 combined reflected light intensities as a function of wavelength, as further described infra, with a weather forecast report of a southwest wind and dry conditions to remotely yield actionable information of having the rotating irrigation system, of the second central pivot crop circle 230, deliver extra water from about the 5 o'clock to 8 o'clock position.

Example IV

In a fourth example, not illustrated, a third central pivot crop circle, as analyzed by the remote agricultural monitoring system 100, requires all of the treatments of the previous two examples: a fertilizer over the entire crop, extra irrigation over an outer perimeter area, and extra irrigation over a southwest region.

Example V

Referring again to FIG. 2, in a fifth example the remote agricultural monitoring system 100 combines absorbance/diffuse reflectance spectra with topography information to generate a recommended treatment of spatially resolved sections of the agricultural land 120. Herein, the remote sensing platform 110 optionally determines topology 250 of the spatially resolved sections of the agricultural land 120 and sections abutting against and/or within less than 20, 30, 40, or 50 meters or uses a topology database to alter a non-topology modified recommendation. For example, at a first point 251 a steep contour is observed on a topology graph and at a second point 252 a smoother contour area is observed. A main controller 310 of the base system 130 optionally adjusts the applied and/or recommended concentration of fertilizer upward to compensate for an expected dilution of the fertilizer with water facilitated transport down the hill and conversely optionally adjusts a down the hill concentration of fertilizer to be applied downward in expectation of runoff of fertilizer from the uphill position.

More generally, the remote agricultural monitoring system 100 allows for monitoring tens, hundreds, and/or thousands of crop areas, such as central pivot crop circles and/or any geometrically shaped field, yields a quantitative metric for each sub-region, such as an individual central pivot crop circle; and/or yields a set of quantitative metrics, such as need for crop protection, herbicide, pesticide, fertilizer, tilling, crop rotation, and/or irrigation for each spatially resolved sub-element of each sub-region all without requiring a visual inspection by the farmer or any sub-region, much less all sub-elements, of the farm.

The inventor notes that output of the remote agricultural monitoring system 100 is optionally used in an automated control of one or more treatment/management systems of the farm sub-elements.

Wavelength Resolution

In this section, remote spectroscopy measurements as a function of wavelength and/or in sections of the electromagnetic spectrum are described. However, the remote spectroscopy functions together with the spatial resolution, described supra, and the temporal analysis, described infra.

Figure 3:
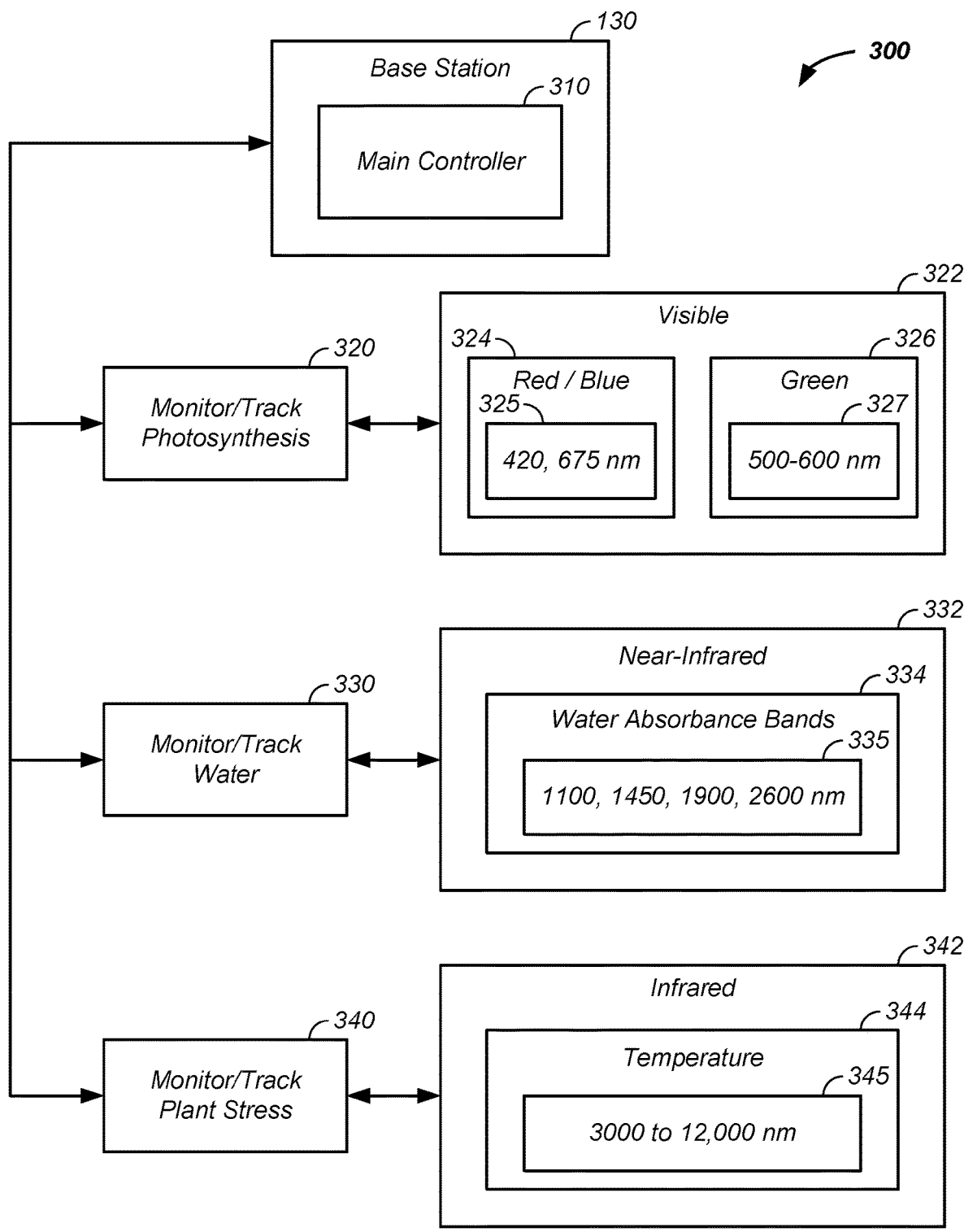
FIG. 3 illustrates monitoring agricultural land using multiple regions of the electromagnetic spectrum.

Referring now to FIG. 3, remote spectroscopy 300 cropland analysis is described using the visible, near-infrared, and infrared regions of the electromagnetic spectrum. For clarity of presentation and without loss of generality, particular wavelengths are use. However, it is recognized that a mean width of an absorbance is wavelength dependent and generally increases with decreasing wavelength. As illustrated, the base station 130 contains the main controller 310. The main controller 310 is directly and/or indirectly linked to the remote sensing platform 110, any intermediate analysis device, any intermediate user, and/or the final user. Generally, cropland analysis uses a combination of three regions of the electromagnetic spectrum: the visible region, the near-infrared region, and the mid-infrared region. Though described separately, the inventor notes that the synergy of combining related information from the multiple wavelength regions is greater than a sum of analyses of the individual wavelength regions.

As described supra, the remote sensing platform 110, satellite 116, spatially resolves the agricultural land 120. More particularly, the remote sensing platform 110 uses one or more two-dimensional detector arrays coupled to an optical imaging system to spatially resolve sections of the agricultural land 120. Further, for each spatially resolved section, of the agricultural land 120, responses are independently measured at multiple wavelengths, such as two or more wavelengths in the visible region and two or more wavelengths in the near-infrared region, and two or more wavelengths in the mid-infrared region. Wavelengths of light are separated, resolved, and/or isolated using a set of optical filters, a grating based spectrometer, a movable mirror based spectrometer with a subsequent Fourier transform, and/or a Hadamard based analyzer. Optionally and preferably, two or three spectrometers, analyzers, wavelength separation approaches, and/or two-dimensional detectors are used to cover the range of wavelengths of interest from about 380 nm to about 12,000 nm, where detectors include silicon based, indium gallium arsenide based, and mercury/cadmium/telluride based detector elements. Resulting signals are optionally and preferably fused, such as after a spatial resolution transform into a resulting data cube. The data cube comprises two axes comprising a projection of the agricultural land 120 along the z-axis onto and x/y-plane of the detector and for each m×n detector element a spectrum, S, is recorded, where the spectrum, S, represents signals from the one, two, three, or more spectrometers. Subsequent data cubes are generated as a function of time, as further described infra. The large data cubes are optionally subsequently analyzed using hardware on the satellite 116 and a smaller results data set is transmitted back to the main controller 310 of the base station 130 and/or is transmitted to the end user or equipment thereof directly. A data cube is optionally broken or separated into component parts, matrices, indices, and the like where the combined data of the individual parts is a subset of the original data cube, a transformation of the original data cube, or a representation of the data cube where underlying information of the combined separated parts includes x/y-position information and remote sensing spectroscopy information associated with the x/y-positions. A processed data cube is referred to herein as an information cube. The information cube comprises a transform of the data cube into an n-dimensional space where the n-dimensional space comprises fewer dimensions than individual wavelength regions measured and placed into the data cube. Optionally and preferably, the information cube is supplemented with additional information, such as by fusion, concatenation, and/or a further transform with non-spectral information, such as further described infra.

The data cube is optionally supplement with non-spectral data/information, such as: underground features; water holding capacity of the soil; soil type, such as clay or sand; tilth; soil depth; rock features; heat holding capacity; and/or localized heat holding features, such as roadways, rock walls, and water bodies.

Example I

Referring still to FIG. 3, a first example of remote spectroscopy 300 is described using visible light 322 from 400 to 700 nm and/or within 50 nm of the visible light to monitor/track an agricultural parameter. For clarity of presentation and without loss of generality, photosynthesis 320 is used as a process monitored in the visible region 322. More particularly, chlorophyll absorbance and reflectance is used to further describe the remote agricultural monitoring system 100. However, the chlorophyll absorbance and reflectance description is representative of remote sensing of other processes/process results, such as: (1) oxygen release during photosynthesis, with oxygen absorbance bands at 755 to 775 nm and 689 to 695 nm, optionally analyzed with polarization techniques and (2) evapotranspiration yielding temperature reduction and water, where the water bands are further described infra.

Optionally and preferably, sunlight is used as a source of visible photons. Red and blue 324 wavelengths of sunlight are absorbed by chlorophyll while the green 326 of green crops represents reflected green light.

More particularly, chlorophyll comprises chlorophyll a and chlorophyll b. Generally, chlorophyll a comprises peak absorbances 325 at 420±10 nm and 675±10 nm and chlorophyll b comprises peak absorbances at 470±15 nm and 625±20 nm. However, chlorophyll absorbs broadly in both the blue and red regions of the electromagnetic spectrum. Hence, absorbance is optionally measured at and/or within ±30, 50, 75, or 100 nm from the peak absorbance. Still more particularly, as chlorophyll absorbs red and blue light, reflected light is optionally used to measure chlorophyll, where chlorophyll is used as an indirect indicator of crop health. For instance, reflected and/or diffusely reflected: (1) green light 327, such as from 500 to 600; (2) ultraviolet light, such as from 200 to 400 nm; and/or (3) near-infrared light, such as from 700 to 1000 nm is used to determine a first health parameter of the crops, being related to the green vigor of the plant and the chlorophyll therein. The inventor notes that non-green light from 480 to 500 nm and/or 600 to 620 nm is optionally used to measure crop health as chlorophyll absorbance drops to less than five percent above 480 nm and rises above five percent at 620 nm.

Optionally and preferably, intensities of multiple visible wavelengths are detected allowing non-linear data analysis and/or chemometric analysis to extract more detailed, accurate, and/or precise sample constituent information. Optional data analysis techniques include: hyperspectral imaging using combinations of wavelengths from the visible, near-infrared, and infrared wavelength regions; multivariate approaches, such as use of partial least squares or principal component regression; artificial intelligence, such as a neural network; a calibration data set used to generate a model for subsequent prediction of values from subsequent measurements; multi-modal measurements, such as temperature, wind speed, humidity, topology, precipitation, time of day, and wavelength intensity information; and/or combining intelligent system information, such as historical information with any of the preceding techniques.

Generally, reflected/diffusely reflected visible light allows the sun to function as the source and to use an intensity detector positioned above the crops, such as carried by the satellite 116, as described supra.

Example II

Still referring to FIG. 3 a second example of remote spectroscopy 300 is described using near-infrared light 332 from 700 to 2500 nm. For clarity of presentation and without loss of generality, monitoring water 330 and optionally tracking water concentration is used as an exemplary process monitored using the near-infrared region 332. Optionally and preferably, sunlight is used as a source of near-infrared. Water is optionally observed anywhere in the near-infrared region; however, preferred wavelengths are at water absorbance bands 334, such as peak water absorbances at 1100, 1450, 1900, and 2600 nm 335. More particularly, larger water absorbance at longer wavelengths results in a small mean depth of detected diffusely reflected sunlight at longer wavelengths. Thus, water content is measured in the outer quarter millimeter of a leaf of a crop from 2350 to 2600 nm and in the outer half millimeter from 2100 to 2350 nm. Greater mean depths of penetration of diffusely reflected light from a crop leaf is observed at shorter wavelengths, such as greater than one-half millimeter from 1500 to 1750 nm and greater than one millimeter from 1100 to 1350 nm or 700 to 1350 nm. Thus, a measure of crop hydration using the near infrared region 332 is obtained using remote spectroscopy 300, such as from the satellite 116. Further, hydration of the leaves of the measured crop as a function of depth of penetration into the leaf is optionally measured using remote spectroscopy 300, which is a measure/quantitative measure of crop health.

Example III

Still referring to FIG. 3 a third example of remote spectroscopy 300 is described using infrared light 342. For clarity of presentation and without loss of generality, plant stress 340 and optionally tracking plant stress is performed through monitoring temperature 344 and optionally tracking temperature, such as through temperature determination using infrared light from 2500 to 12,000 nm 345 in the infrared region 342. Optionally, infrared light and/or changes in infrared light as a function of time is detected in twilight, dark, or dawn through detection photons radiating from stored heat sources to determine crop health and/or supplement the data cubes, described supra. Particularly, time-offset heat information is coupled to daytime data cubes through ground location indices.

Optionally and preferably, the crop and/or soil emits infrared light and the light is monitored directly, such as via an intensity versus position measurement, optionally at 1, 2, 3, 5, 10, 25, 50, 100 or more infrared wavelengths.

Example IV

Figure 4:
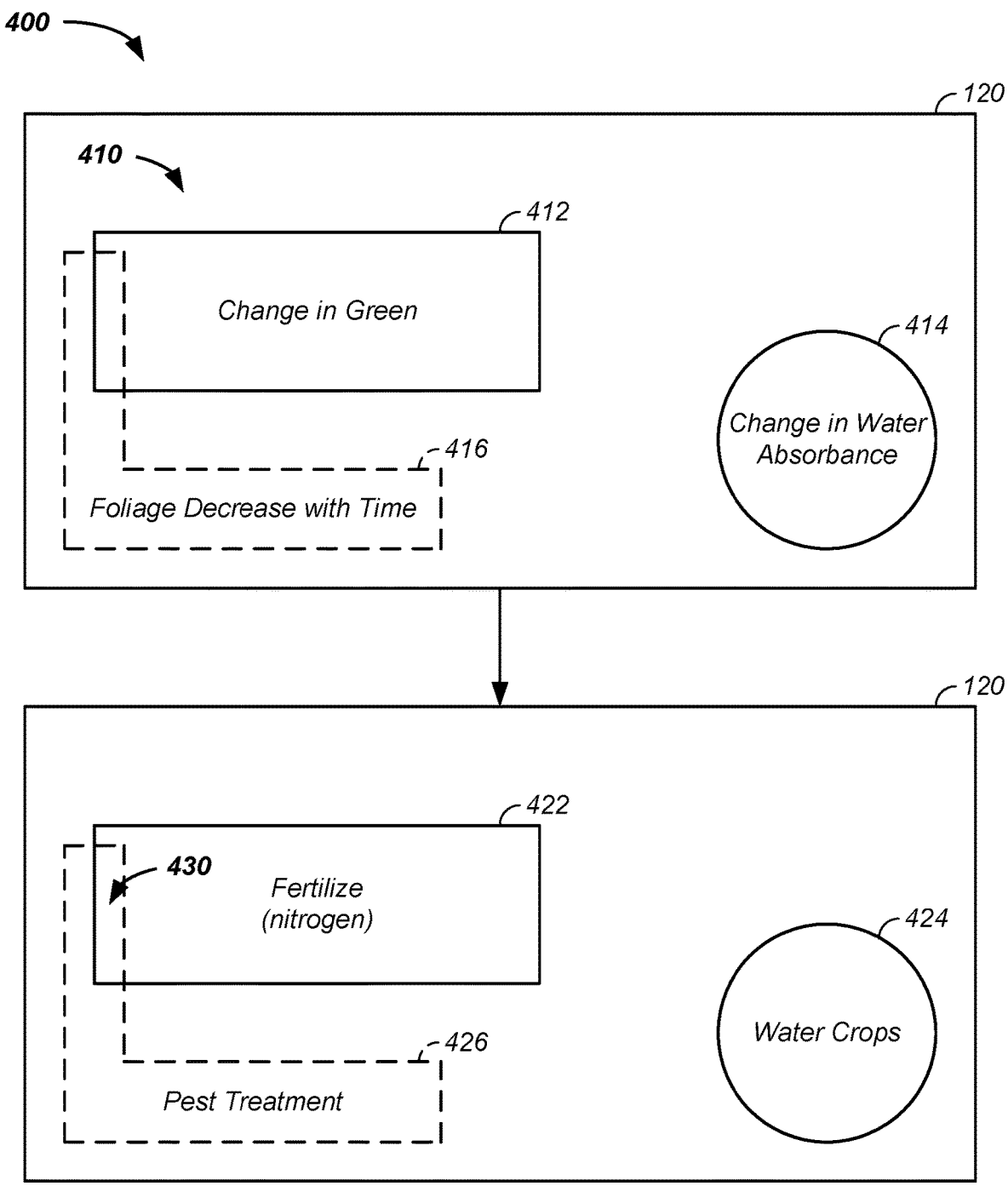
FIG. 4 illustrates combining multiple regions of spatially resolved light and resulting actionable intelligence.

Referring now to FIG. 4, monitoring crops using multiple regions of light 400, including at least two of and preferably all of the visible 322, the near-infrared 332, and the infrared 342 regions, is further described. In this non-limiting example, a set of crop areas 410 of the agricultural land 120 are simultaneously monitored as the satellite 116 moves over/by/past the agricultural land 120.

More particularly: (1) a first crop area 412 reveals a decrease in diffusely reflected green light in the visible region; (2) a second crop area 414 reveals a change in water absorbance 414 in the near-infrared coupled with a more rapid temperature rise as a function of time of day, normalized by weather parameters, as observed in the infrared; and (3) a third crop area 416 reveals a foliage decrease through reduction in green in the visible region, a change in observed water absorbance in the near-infrared region, and more rapid temperature swings in the infrared region. Resulting actionable results/recommendations are to fertilize 422, water 424, and add pesticide 426 to the first, second, and third crop areas 412, 414, 416, respectively. Notably, an overlapping area 430 optionally receives more than one treatment type. Generally, the first, second, and third crop areas 412, 414, 416 respectively illustrate an analysis with one, two, and three of the visible, near-infrared, and infrared wavelength regions.

Temporal Analysis

In this section, temporal analysis of data from the above described spatial resolution and wavelength resolution is described.

Figure 5:
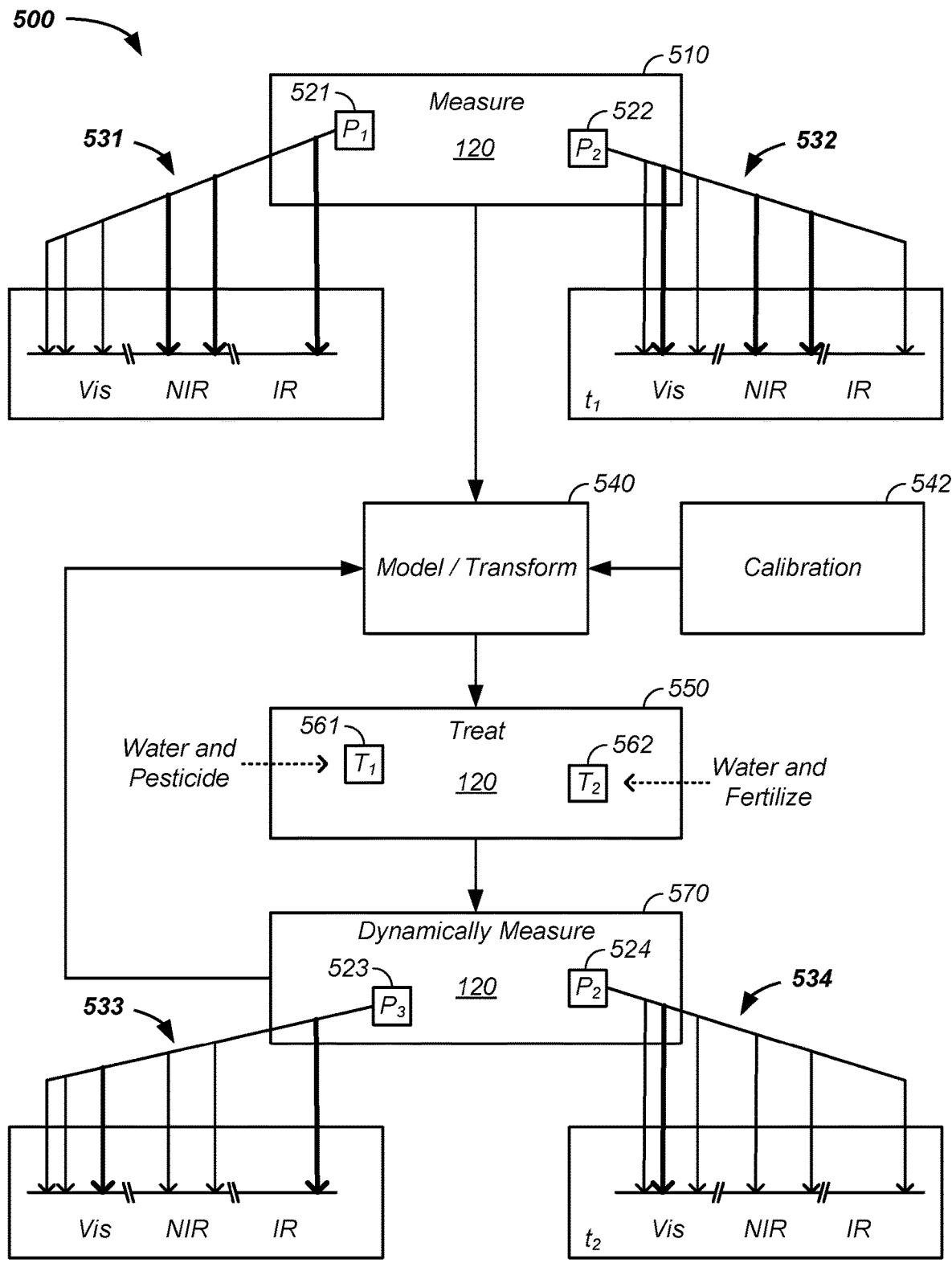
FIG. 5 illustrates agricultural monitoring using a dynamically updated, spatially resolved, and multi-region wavelength resolved system.

Referring now to FIG. 5, an iterative crop analysis system 500 is described. In a prior step 510, the agricultural land 120 is measured both: (1) spatially and (2) spectroscopically. Generally, an m×n matrix of cropland areas are measured, where m and n are positive integers, such as greater than 10, 50, 100, 500, 1,000, 5,000, or 10,000, where the size of the m×n matrix optionally relates to pixels in an associated two-dimensional detector, described supra. More particularly, as illustrated, a spatially resolved first position, $P_1$, 521 and second position, $P_2$, 522 of the agricultural land 120 are remotely monitored, yielding a first response vector 531 and a second response vector 532, respectively. The two crop areas, identified as the first position 521 and the second position 522, illustrate regions that require treatment. In this case six spectral responses are illustrated of x wavelengths, where x is a positive integer of at least 3, 5, 10, 15, 25, 50, 100, or 1000. A first iterative step of using a model 540 to analyze the spatially resolved spectral responses shows that: (1) the first response vector 531 reveals three outlier responses, denoted with thicker lines, indicative of a first required treatment and (2) the second response vector 532 reveals a different three outlier responses indicative of a second required treatment. Calibration 542 of the model 540 is further described, infra. A second iterative step of treating 550 the agricultural land 120 is performed. As illustrated, a first treatment, $T_1$, 561 of applying water and pesticide to the first position 521 is performed based on the near-infrared water absorbance signals and mid-infrared temperature signals, as described supra. Similarly, a second treatment, $T_2$, 562 of applying water and fertilizer to the second position 522 is performed based on the visible and near-infrared water absorbance signals, as described supra. A third iterative step of dynamically measuring 570 updates information on previously treated positions and/or identifies new positions requiring treatment. In the first dynamic update illustrated: (1) the first position 521 indicates a successful treatment; (2) a fourth response vector 534, an update of the second response vector 532, indicates that watering the second position 524 was successful, but more fertilizer is required; and (3) a third position, $P_3$, is now identified that requires treatment. The iterative steps of using the model 540 to generate a recommended treatment, treating 550 the identified positions, and updating measurement by way of the step of dynamically measuring 570 are optionally and preferably repeated at least daily, two, three, or more times a week, weekly, every other week, and/or monthly season after season. To perform this with satellites, a constellation of greater than 5, 10, 25, or 50 satellites is optionally and preferably used. The calibration step 542 uses known and/or reference measurements to calibrate the multivariate model 540.

Figure 6A:
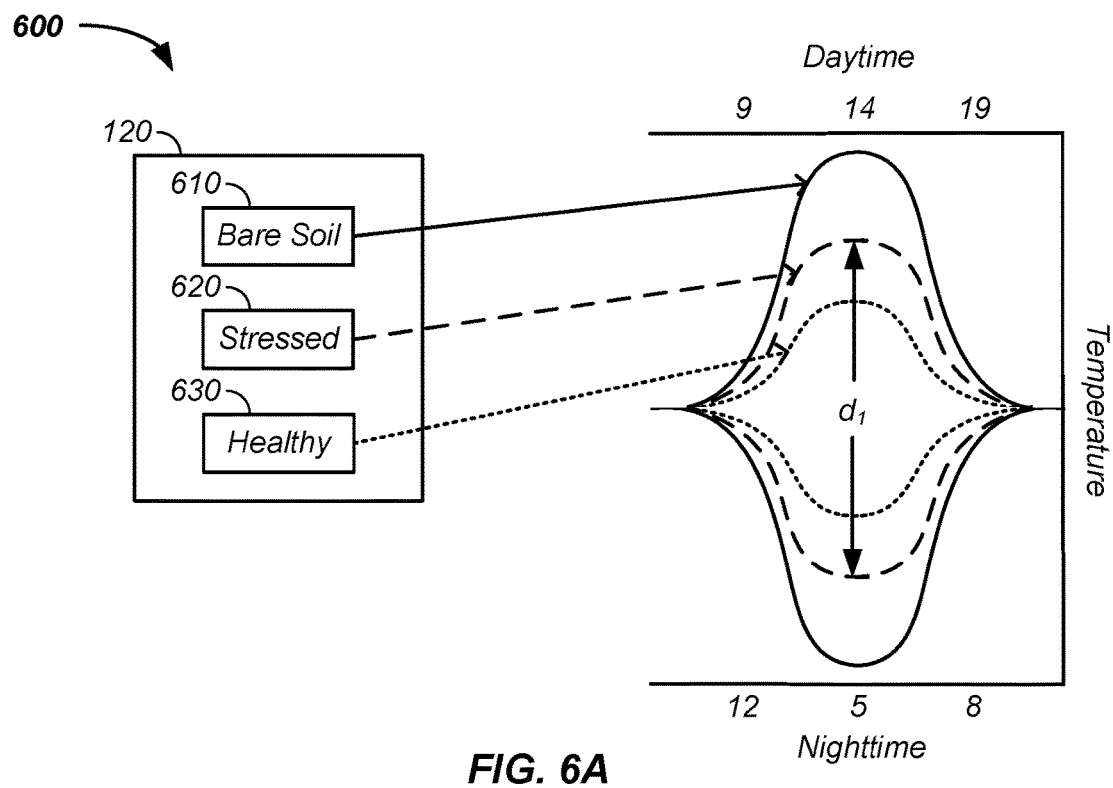
FIG. 6A and FIG. 6B illustrate a temporally updated wavelength and spatially resolved agricultural monitoring system.
Figure 6B:
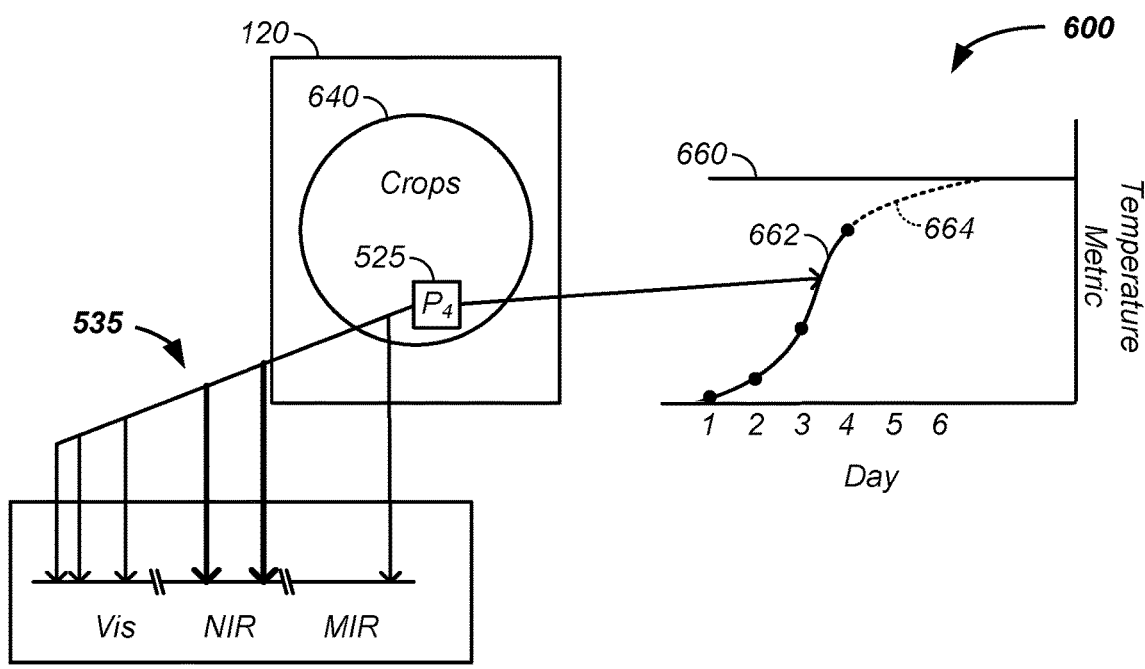

Referring now to FIG. 6A and FIG. 6B a first example of crop health analysis 600 is provided. The crop health analysis 600 example illustrates calibrating a model, acquiring measured data, applying the model to the measured data, and repeating the iterative process as a function of time to yield information on a given position of the agricultural land 120. Particularly, as illustrated, spectral responses from the visible, near-infrared, and infrared measurement systems on the satellites 116 are correlated with reference information, such as the state of the agricultural land 120 being bare soil 610, stressed crops 620, or healthy crops 630. For clarity of presentation and without loss of generality, a particular relationship between temperature as a function of time of day relative to condition of a location of the agricultural land 120 is illustrated. As illustrated, the temperature of bare soil 610, healthy crops 630, and stressed crops 620, adjusted for weather conditions and weather history, reaches a maximum temperature in the afternoon, such as at two o'clock post meridiem. However, the peak temperature of the healthy crops 630 is less than the bare soil 610 and as the crops are increasingly stressed 620, the peak temperature departs from the peak temperature of the healthy crops 630 and increases toward the peak temperature of the bare soil 610. Thus, a quantitative measure of crop stress results. Naturally, any combination of wavelengths, ratios, and/or analytical approaches are used to find, determine, and/or use correlations/relationships of differing degrees of plant stress with the satellite gathered data. Referring now to FIG. 6B, a fourth position, $P_4$, 525 of a crop sub-area 640 of agricultural land 120 yields a fifth response vector 535, determined by the model 540 to have a measure of crop stress, such as related to hydration. Using the iterative crop analysis system 500, described supra, the measure of crop stress 662 is observed to increase as a function of time, such as over a course of days, toward a previously determined stress threshold 660, such as a first visual sign or crop stress. Further, as illustrated, the model 540 prognosticates 664 that the crop at the fourth position 525 will reach the stress threshold 660 in two days if not treated according to the recommended treatment provided by the model 540 using the fifth response vector 535.

Still referring to FIG. 6A and FIG. 6B a second example of crop health analysis 600 is provided. The crop health analysis 600 example above illustrates calibrating a model, acquiring measured data, applying the model to the measured data, and repeating the iterative process as a function of time to yield information on a given position of the agricultural land 120. In this example, a differential analysis is used to compensate/normalize parameters that affect temperature, such as cloud cover, humidity, solar activity, and/or percent of crop cover. Particularly, as illustrated, spectral responses from the visible, near-infrared, and infrared measurement systems on the satellites 116 are correlated with reference information, such as the state of the agricultural land 120 being bare soil 610, stressed crops 620, or healthy crops 630 are optionally recorded overnight. As illustrated, the temperature of bare soil 610, healthy crops 630, and stressed crops 620, reaches a minimum temperature in the early morning, such as at five o'clock ante meridiem. However, the minimum temperature of the healthy crops 630 is greater than the bare soil 610 and as the crops are increasingly stressed 620, the minimum temperature departs from the minimum temperature of the healthy crops 630 and decreases toward the minimum temperature of the bare soil 610. Thus, a second quantitative measure of crop stress results. As outside parameters affect daytime and nighttime temperatures a form of a normalized adjusted temperature is a differential temperature, $d_1$, between a daytime reading, such as a high temperature, and a nighttime reading, such as a low temperature, where the differential temperature is a third metric. Referring again to FIG. 6B, the temperature metric optionally refers to the second metric and preferably refers to the third metric due to an internal adjustment for outside temperature adjusting parameters.

In another example, crop type and crop growth as a function of time are used to further aid development of a recommended treatment for each location as a function of time using multi-wavelength band spectral data. The crop type and crop growth information is optionally provided; however, preferably the crop type and crop growth stage is determined using the remote agricultural monitoring system 100. For instance, the crop is identified as corn or soybean. Further, a post-sprout age of the crop is determined using the remote agricultural monitoring system 100. As treatment requirements for a first crop type, such as corn, differs as a function of time, such as 6 or 12 weeks post-sprout, and as treatment requirements for the first crop type differ from a second crop type, such as soybeans, the recommended treatment 550 provided by the model 540 is optionally and preferably adjusted by a basis set database for the identified crop and identified time period in the crop life.

Generally, the model 540, using calibration data 542, operates on an initial prior measurement 510/one-time measurement and/or a dynamically updated measurement 570 to generate a recommended treatment 550, using a spectral response vector, for one or more positions of the agricultural land 120. The response vector input to the model 540 is optionally and preferably supplemented with one or more of:
  soil measurements/type, such as clay, sand, or organic optionally as a function of depth;
  weather reports: historical, current, and/or forecast;
  solar reports: UV index, elevation, sun spots;
  soil treatment history: amendments, pesticide use, herbicide use, fertilizer use;
  topology;
  pest history/projection;
  invasive species history/projection: plant and/or animal; and
  a projected harvest date, to avoid crop treatment residual on harvest.

In another example, one or more satellites orbit the planet in low, medium, and/or high orbits, where each satellite is designed to enable acquisition of remote sensing information with high spatial resolution and high temporal resolution. Ground spatial resolution of ten meters or less is used to identify features in sub-regions within agricultural fields containing either healthy crops or crops under stress. Temporal resolution comprises satellite revisits over the same geographical region on a daily basis or better to provide information to decision makers, such as farmers, to make important decisions to apply the necessary resources to mitigate problems detected in these regions. Satellites are optionally arranged in a constellation to enable high temporal resolution of daily revisits or better by satellites at the same ground location. The acquired remote-sensing data is optionally processed onboard each satellite to generate data and information products for dissemination to appropriate consumers within less than 6, 12, 24, 36, or 48 hours from the time of data acquisition.

In another example, after the remote agricultural monitoring system 100 gathers information with a satellite 116, such as at a first resolution, optionally a secondary system is used to further map identified trouble areas and/or areas with highly variable treatment recommendations. For instance, if an entire area calls for fertilizer, then a second higher resolution analysis is not necessarily necessary. However, if the satellite 116 results reveal a patchwork of treatment recommendations, such as varying on the order of the resolution of the satellite data, then the secondary system, such as the airplane 112 or a drone, is used to further map, enhance the existing map, and/or remap the identified patchwork area. As the drone altitude is substantially less than the satellite, enhanced spatial resolution is made possible and can be made with some intermittent interferences, such as clouds. The inventor notes that optionally copies of the spectrometers mounted on the satellite 116 are used on the drone resulting in enhanced spatial resolution, due to the lower altitude of the drone. Further, the identical copies or identical sub-element copies of the satellite analyzers greatly reduces complexities of designing, developing, and implementing the data collection hardware and/or greatly reduces complexities of merging a first data cube from the satellite 116 with a second data cube from the drone due to similarities of baselines, noise characteristics, response curves, and/or any spectra altering hardware element of the analyzer.

In still another example, remote sensing is performed at one or more electromagnetic wavelength bands such as the visible, near infrared, mid-infrared, long wavelength infrared, microwave, and/or radio bands. Sensors onboard satellites acquire point measurements and preferably imaging measurements of the planetary surface locations. Different kinds of information are acquired from each of the above-mentioned electromagnetic spectral bands. For example, the visible and near infrared bands allow determination of coverage of the land surface by vegetation or bare soil, mid-infrared wavelength bands allow determination of atmospheric moisture content, long wavelength infrared measurements allow determination of the land surface temperature both of vegetation and soil, and microwave and radio bands allow measurements of the soil moisture content as well as the refractive index of the atmosphere.

In yet another example, specialized communication protocols are used for optimizing the rapid uplink and downlink of information to and from the orbiting satellites from ground transmission/receiving stations. High-speed processing of acquired information onboard the orbiting satellites in a near real time manner is optionally and preferably used to generate derived information products, such as those described above. Further, specialized algorithms for the efficient processing of the acquired information and generating derivative information products are used in conjunction with methods for rapid dissemination of data and derivative information products within 24 hours of remote-sensing acquisition. Thus, large data sets, the raw data cubes, are analyzed to generate actionable results, which are optionally and preferably rapidly transmitted, such as to an end-user, an end-user cell phone/computer, and/or an electromechanical farm implement.

In still another example, information derived from the satellite based remote sensing system is provided to one or more autonomous and/or semi-autonomous agricultural implements and/or systems, such as to a fertilizer, herbicide deployment system, pest reducer, irrigator, crop inspector, and/or harvester, where the information is direct sent to the agricultural implements and/or indirectly sent to the agricultural implements.

Still yet another embodiment includes any combination and/or permutation of any of the elements described herein.

The main controller, a localized communication apparatus, and/or a system for communication of information optionally comprises one or more subsystems stored on a client. The main controller is optionally and preferably linked directly, indirectly, and/or wirelessly to one or more electromechanical devices, such as instrumentation and computing elements. The client is a computing platform configured to act as a client device or other computing device, such as a computer, personal computer, a digital media device, and/or a personal digital assistant. The client comprises a processor that is optionally coupled to one or more internal or external input device, such as a mouse, a keyboard, a display device, a voice recognition system, a motion recognition system, or the like. The processor is also communicatively coupled to an output device, such as a display screen or data link to display or send data and/or processed information, respectively. In one embodiment, the communication apparatus is the processor. In another embodiment, the communication apparatus is a set of instructions stored in memory that is carried out by the processor.

The client includes a computer-readable storage medium, such as memory. The memory includes, but is not limited to, an electronic, optical, magnetic, or another storage or transmission data storage medium capable of coupling to a processor, such as a processor in communication with a touch-sensitive input device linked to computer-readable instructions. Other examples of suitable media include, for example, a flash drive, a CD-ROM, read only memory (ROM), random access memory (RAM), an application-specific integrated circuit (ASIC), a DVD, magnetic disk, an optical disk, and/or a memory chip. The processor executes a set of computer-executable program code instructions stored in the memory. The instructions may comprise code from any computer-programming language, including, for example, C originally of Bell Laboratories, C++, C#, Visual Basic® (Microsoft, Redmond, Wash.), Matlab® (MathWorks, Natick, Mass.), Java® (Oracle Corporation, Redwood City, Calif.), and JavaScript® (Oracle Corporation, Redwood City, Calif.).

Herein, any number, such as 1, 2, 3, 4, 5, is optionally more than the number, less than the number, or within 1, 2, 5, 10, 20, or 50 percent of the number.

Herein, an element and/or object is optionally manually and/or mechanically moved, such as along a guiding element, with a motor, and/or under control of the main controller.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for managing cropland comprising the steps of:
digitally and wirelessly linking a remote sensing platform to a ground based communication system;
spatially resolving into a set of locations an m×n ground matrix using both optics and detectors of the remote sensing platform, where m and n comprise positive integers of at least one hundred;
using the remote sensor platform, optically measuring for each member of the spatially resolved set of locations:
first reflected cropland radiation, in a first range of 400 to 1,100 nm, in at least two non-overlapping wavelength regions using the remote sensing platform;
second reflected cropland radiation in a second range of 700 to 2500 nm; and
emitted radiation, in a third range of 2,500 to 12,000 nm;
generating a crop health data set of the spatially resolved set of locations and the associated first reflected cropland radiation, the second cropland radiation, and the emitted radiation;
repeating said steps of spatially resolving and optically measuring to update the crop health data set at least every four days during a period of at least one month;
analyzing the crop health data set to yield a crop health analysis comprising specific crop management recommendations for each element of the spatially resolved set of locations; and
communicating the specific crop management recommendations to a farm treatment system.

2. The method of claim 1, said step of optically measuring for each set of locations further comprising the steps of:
measuring chlorophyll indirectly using at least one non-green wavelength shorter than 620 nm and at least one near-infrared wavelength; and
measuring crop hydration using at least two wavelength resolved and separated wavelength regions in a range of 700 to 2,500 nm, said step of measuring chlorophyll indirectly using a first two-dimensional detector array and said step of optically measuring emitted radiation using a second two-dimensional detector array.

3. The method of claim 2, said set of measuring chlorophyll indirectly further comprising the step of:
comparing first light in a range of 480 to 500 nm with second light greater than 700 nm.

4. The method of claim 2, further comprising the step of:
calculating a crop stress metric using the crop health data, said step of calculating the crop stress metric comprising the steps of:
using a daytime readings of the set of locations in a range of 8,000 to 12,000 nm; and
using a nighttime readings of the set of locations in a range of 8,000 to 12,000 nm.

5. The method of claim 4, said step of optically measuring further comprising the steps of:
gathering first data for the crop health data set using a satellite; and
updating the first data for the crop health data set using a drone.

6. The method of claim 1, said step of analyzing further comprising the step of:
generating a crop stress metric using the crop health data, said crop stress metric comprising a temperature related deviation between the analyzed signal and at least one of: a reference healthy crop temperature related signal and a reference bare soil temperature related signal.

7. The method of claim 6, said step of generating the crop stress metric, further comprising the step of:
using a daytime reading of a member of the set of locations and a nighttime reading of the member of the set of locations.

8. The method of claim 6, said step of generating the crop stress metric, further comprising the steps of:
using a daytime reading of a member of the set of locations in a range of 8,000 to 12,000 nm; and
using a non-daytime reading of the member of the set of locations in a range of 8,000 to 12,000 nm.

9. The method of claim 6, said step of analyzing further comprising the steps of:
determining a crop type using the crop health data set;
determining a lifetime period of the crop type using the crop health data set; and
adjusting the crop health analysis using the crop type and the lifetime period.

10. The method of claim 1, said step of optically measuring further comprising the steps of:
gathering first data for the crop health data set using a satellite; and
gathering second data for the crop health data set using a drone.

11. The method of claim 10, further comprising the step of:
the farm treatment system implementing at least a portion of the specific crop management recommendations.

12. The method of claim 1, said step of analyzing the crop health data set further comprising the step of:

using a model to determine a metric of extent of deviation of a combination of data from the crop health data set relative to the combination of data from a reference data set.

13. The method of claim 12, said step of analyzing, further comprising the step of:
using the metric to generate a quantitative value for at least one element of the specific crop management recommendations.

14. The method of claim 12, said step of analyzing the crop health data set further comprising the step of:
using a model to determine a temperature related metric of extent of deviation of a combination of data from the crop health data set relative to the combination of data from a reference data set.

15. The method of claim 14, said step of analyzing, further comprising the step of:
using the metric to generate a quantitative value for at least one element of the specific crop management recommendations.

16. The method of claim 15, further comprising the step of:
the farm treatment system implementing at least a portion of the specific crop management recommendations.

17. The method of claim 16, the step of repeating said steps of spatially resolving and optically measuring further comprising the step of:
using a constellation of satellites and a drone.

18. The method of claim 17, the step of repeating said steps of spatially resolving and optically measuring further comprising the step of:
using a drone.

19. An apparatus for managing cropland comprising:
a remote sensing platform digitally and wirelessly linked to a ground based communication system, said remote sensing platform configured to:
spatially resolve into a set of locations an m×n ground matrix using both optics and detectors of the remote sensing platform, where m and n comprise positive integers of at least one hundred;
optically measure for each member of the spatially resolved set of locations:
first reflected cropland radiation, in a first range of 400 to 1,100 nm, in at least two non-overlapping wavelength regions using the remote sensing platform;
second reflected cropland radiation in a second range of 700 to 2,500 nm; and
emitted radiation, in a third range of 2,500 to 12,000 nm;
generate a crop health data set of the spatially resolved set of locations and the associated first reflected cropland radiation, the second cropland radiation, and the emitted radiation; and
repeat said steps of spatially resolving and optically measuring to update the crop health data set at least daily during a period of at least one month;
an analyzer configured to analyze the crop health data set to yield a crop health analysis comprising specific crop management recommendations for each element of the spatially resolved set of locations;
a communicator configured to communicate the specific crop management recommendations to a farm treatment system, wherein the farm treatment system implements at least one of the specific crop management recommendations on the cropland.

* * * * *